(12) United States Patent
Zhou et al.

(10) Patent No.: US 9,695,849 B2
(45) Date of Patent: Jul. 4, 2017

(54) SUPPORT FOR ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xiao-Gang Zhou, Shenzhen (CN); Wei-Min Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 70 days.

(21) Appl. No.: 14/752,301

(22) Filed: Jun. 26, 2015

(65) Prior Publication Data

US 2016/0095236 A1    Mar. 31, 2016

(30) Foreign Application Priority Data

Sep. 26, 2014  (CN) .......................... 2014 1 0498336

(51) Int. Cl.
| | |
|---|---|
| A47B 96/06 | (2006.01) |
| F16B 2/12 | (2006.01) |
| F16M 11/04 | (2006.01) |
| F16M 11/14 | (2006.01) |
| F16M 11/40 | (2006.01) |
| F16M 13/00 | (2006.01) |
| F16M 13/02 | (2006.01) |

(52) U.S. Cl.
CPC ............ *F16B 2/12* (2013.01); *F16M 11/041* (2013.01); *F16M 11/14* (2013.01); *F16M 11/40* (2013.01); *F16M 13/00* (2013.01); *F16M 13/022* (2013.01)

(58) Field of Classification Search
USPC ................. 248/688, 689, 121, 229.1, 229.13
See application file for complete search history.

(56) References Cited

U.S. PATENT DOCUMENTS

| | | | | |
|---|---|---|---|---|
| 5,187,744 | A  * | 2/1993 | Richter ............... | B60R 11/0241 224/553 |
| 5,769,369 | A  * | 6/1998 | Meinel .................. | B60N 3/001 108/45 |
| 8,376,292 | B2 * | 2/2013 | Cicco ..................... | B60R 11/02 248/176.1 |
| 8,469,325 | B2 * | 6/2013 | Yu .......................... | G10G 5/005 248/231.51 |
| 8,602,662 | B1 * | 12/2013 | Mans ................... | F16M 11/041 248/160 |
| 8,833,716 | B2 * | 9/2014 | Funk ..................... | F16M 13/02 248/309.1 |
| 8,905,367 | B2 * | 12/2014 | Bury ..................... | B60R 11/02 224/929 |
| 9,016,658 | B2 * | 4/2015 | Barnard ............... | F16M 11/041 248/688 |

(Continued)

*Primary Examiner* — Bradley Duckworth
(74) *Attorney, Agent, or Firm* — Steven Reiss (57) ABSTRACT

A support includes a support member including a main body and an extension body extending from the main body; a clamping member coupled to the main body and being movable relative to the main body; and a holding portion defined between the support member and the clamping member and configured to receive the electronic device. The support member and the clamp member are configured to cooperatively clamp the electronic device in the holding portion.

18 Claims, 6 Drawing Sheets

(56) References Cited

U.S. PATENT DOCUMENTS

| | | | | |
|---|---|---|---|---|
| 9,038,971 B1* | 5/2015 | Guthrie | F16M 13/022 | 248/121 |
| 9,286,816 B2* | 3/2016 | Stanley | G09F 21/04 | |
| 9,448,588 B2* | 9/2016 | Barnard | G06F 1/1626 | |
| 2004/0061038 A1* | 4/2004 | Solich | A47B 23/00 | 248/444 |
| 2006/0290654 A1* | 12/2006 | Wang | B60R 11/0235 | 345/156 |
| 2010/0025444 A1* | 2/2010 | Tipton | A45F 5/00 | 224/576 |
| 2010/0155562 A1* | 6/2010 | He | B60R 11/02 | 248/425 |
| 2011/0139945 A1* | 6/2011 | Fahrberger | H04M 1/04 | 248/121 |
| 2012/0241567 A1* | 9/2012 | Gillespie-Brown | B60R 11/00 | 248/122.1 |
| 2012/0273630 A1* | 11/2012 | Gillespie-Brown | F16M 11/041 | 248/122.1 |
| 2013/0092805 A1* | 4/2013 | Funk | F16M 13/02 | 248/121 |
| 2013/0175413 A1* | 7/2013 | Waugh | F16M 11/041 | 248/124.1 |
| 2013/0228662 A1* | 9/2013 | Green | G06F 1/1607 | 248/229.1 |
| 2015/0034778 A1* | 2/2015 | Lin | G06F 1/1613 | 248/124.1 |
| 2015/0048233 A1* | 2/2015 | Dumas | F16M 11/32 | 248/550 |
| 2015/0072555 A1* | 3/2015 | Riddiford | F16M 11/041 | 439/575 |
| 2015/0129724 A1* | 5/2015 | Kohmoto | F16B 2/12 | 248/52 |
| 2015/0267863 A1* | 9/2015 | Chang | A45B 3/00 | 248/333 |
| 2015/0305518 A1* | 10/2015 | Galant | F16M 11/041 | 248/551 |
| 2015/0313026 A1* | 10/2015 | Yu | G06F 1/1626 | 248/285.1 |
| 2015/0336495 A1* | 11/2015 | Maslakow | B60N 3/00 | 224/401 |
| 2015/0359114 A1* | 12/2015 | Yang | F16M 11/041 | 248/161 |
| 2016/0108942 A1* | 4/2016 | Yu | F16M 13/00 | 248/316.4 |

\* cited by examiner

SUPPORT FOR ELECTRONIC DEVICE

FIELD

The subject matter herein generally relates to supports, particularly relates to a support for electronic devices such as mobile phones, tablets and other electronic devices.

BACKGROUND

Electronic devices such as smart phone and tablets more and more get the favor of people. It becomes a great hobby for modern people to use the electronic devices to watch video, read novels or other online entertainment. Generally, it is comfortable for people to use a support to support the electronic device in use.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a support for electronic devices. The support can include a support member comprising a main body and an extension body extending from the main body; a clamping member coupled to the main body and being movable relative to the main body; and a holding portion defined between the support member and the clamping member and configured to receive the electronic device. The support member and the clamp member are configured to cooperatively clamp the electronic device in the holding portion.

Figure 1:
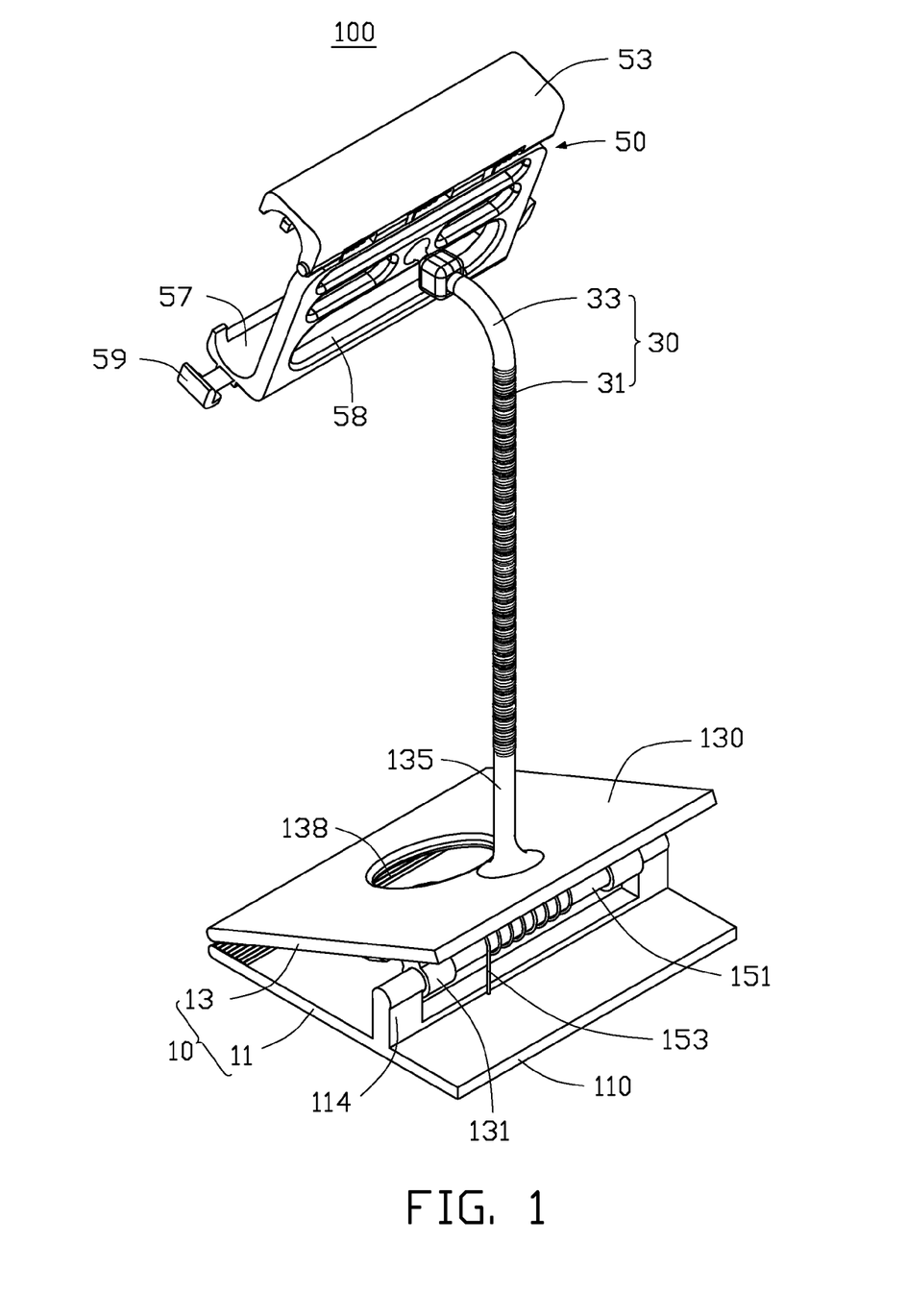
FIG. 1 is an assembled, isometric view of a support for electronic device in accordance with an embodiment of the present disclosure.
Figure 2:
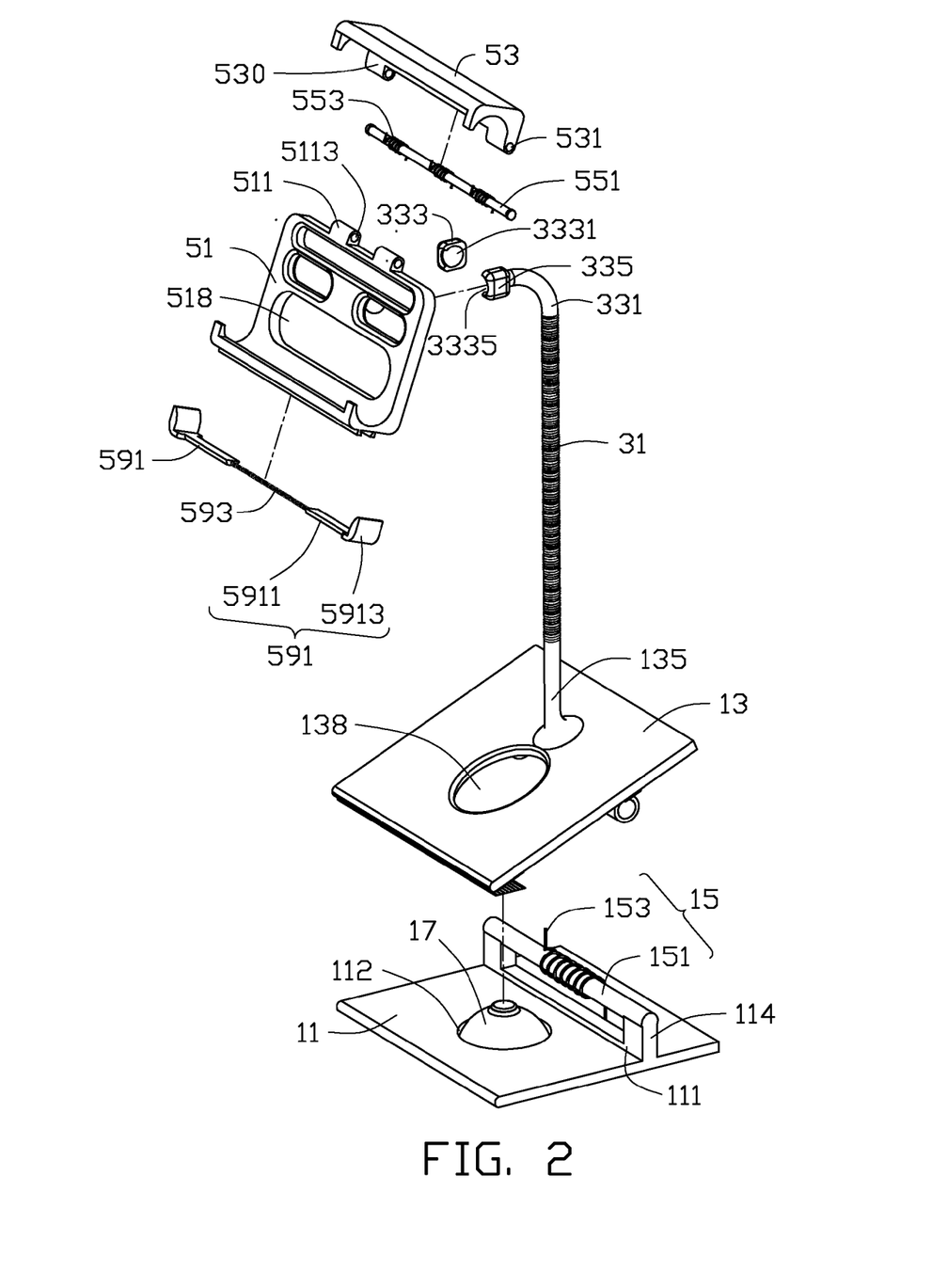
FIG. 2 is an exploded, isometric view of the support in FIG. 1.
Figure 3:
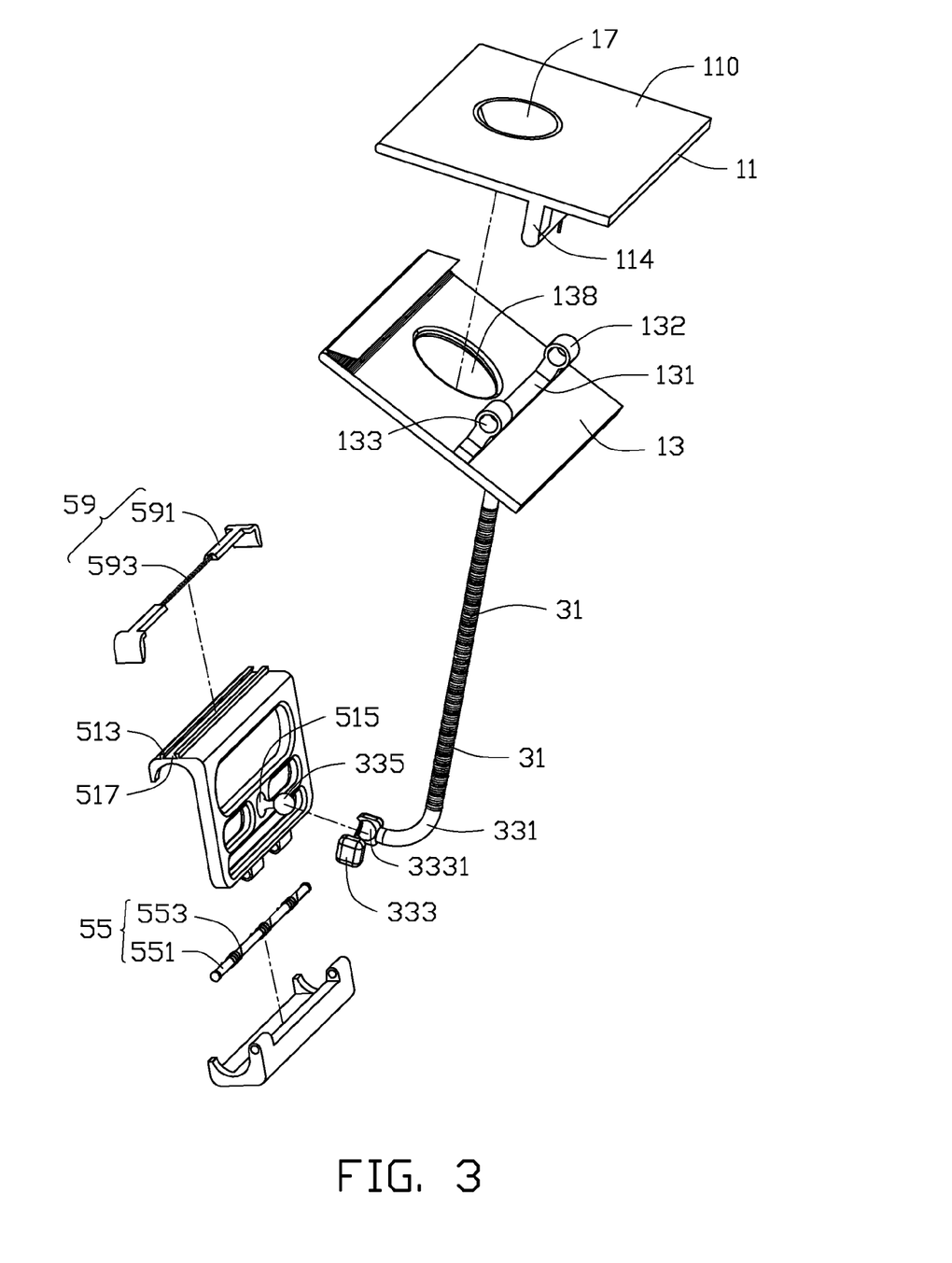
FIG. 3 is an isometric view of the support in FIG. 2, but viewed from another angle.

FIGS. 1-3 illustrate a support 100 of an embodiment of the present disclosure for supporting electronic devices such as mobile phones and the tablets. The support 100 can include a positioning device 10, a coupling device 30 coupled to the positioning device 10, and a holding device 50 coupled to the coupling device 30 for receiving the electronic devices. In at least one embodiment, the coupling device 30 is rotatable relative to the positioning device 10.

The positioning device 10 can include a first board 11, a second board 13 and a connecting member 15 connecting the first board 11 and the second board 13. In at least one embodiment, the first board 11 and the second board 13 can be pivotally connected by the connecting member 15.

The first board 11 can include a positioning face 110 configured to position the support 100 to an object such as a table, the floor, a wall or other things. The first board 11 further includes a first coupling face opposite to the positioning face and facing the second board 13. The first board 11 includes a first coupling member 111 extending from a portion deviating a center of the first coupling face toward the second board 13. The first coupling member 111 can include two spaced protrusions 114. The two spaced protrusions 114 can be located at a straight line which is parallel to an edge of the first board 11. The first board 11 can be a flat plate.

The second board 13 includes a mounting face 130 and a second coupling face opposite to the mounting face 130. The second board 13 further includes a second coupling member 131 extending from the second coupling face toward and for coupling the first coupling member 111. The second coupling member 131 can include two spaced mounting parts 132 extending toward the two protrusions 114 respectively. Each mounting parts 132 defines a through mounting hole 133. The two mounting holes 133 of the two mounting parts 132 can be located at a straight line which is parallel to an edge of the second board 13, for mounting the pivot member 15. The second board 13 can be a flat plate.

The connecting member 15 can include a pivot shaft 151 and an elastic member 153 coupling the pivot shaft 151. In this embodiment, the pivot shaft 151 has two ends thereof extending through the two mounting holes 133 of the mounting parts 132 of the second coupling member 131 and couples the two protrusions 114 of the first coupling member 111, thereby coupling the first board 11 and the second board 13 together. The elastic member 153 can include a main portion sleeving on the pivot shaft 151 between the two mounting parts 132, and two extension portions extending from two ends of the main portion. The two extension portions extend toward the first board 11 and the second board 13 respectively. In at least one embodiment, the elastic member 153 can be a torsion spring. The two extension portions of the elastic member 153 abut against the first coupling face of the first board 11 and the second face of the second board 13, respectively. In at least an embodiment, the first board 11, second board 13 and the connecting member 15 are cooperatively configured to be a clip, particularly to be a pinch cock.

The positioning device 10 can further include a suction cup 17 coupled to the first board 11, and configured to suction a face of an object to retain the positioning device 10 to the object. The first board 11 defines a first through hole 112 substantially in a center portion therefore. The through hole 112 extends through the positioning face 110 and the first coupling face, mounting the suction cup 17 therein. The second board 13 defines a second through hole 138 corresponding to the first through hole 112, and exposing the suction cup 17 when the suction cup 17 is mounted in the through hole 112.

The coupling device 30 can include a strut 31 and an adjusting member 33 coupled to the strut 31. The strut 31 can include a connecting part 311 and a pole part 313 extending from the connecting part 311. The pole part 313 can be bent to be different height. In at least an embodiment, the pole part 313 can be a flexible member such as a flexible metal tubing. The adjusting member 33 can include an elbow 331 coupled to an end of the pole part 313 remote from the connecting part 311, a coupling portion 333 coupled to the elbow 331 remote the pole part 313, and a connector 335 rotatably coupled to the coupling portion 333. The coupling portion 333 defines a receiving room 3331 in a main part thereof adjacent to the elbow 331, and an activity room 3335 in a tail part thereof remote from the elbow 331. The activity room 3335 and the receiving room 3331 are communicated with each other. In at least one embodiment, the coupling portion 333 can include two same semi-coupling portions 3338. Each semi-coupling portions 3338 defines a receiving space and a concave communicating with the receiving space. When the two semi-coupling portions 3338 are assembled together, the two receiving spaces of the two semi-coupling portions 3338 cooperatively define the receiving room 3331, the two concaves of the two semi-coupling portions 3338 cooperatively define the activity room 3335. The connector 335 can be a bulb rotatably blocked in the receiving room 3331.

Figure 4:
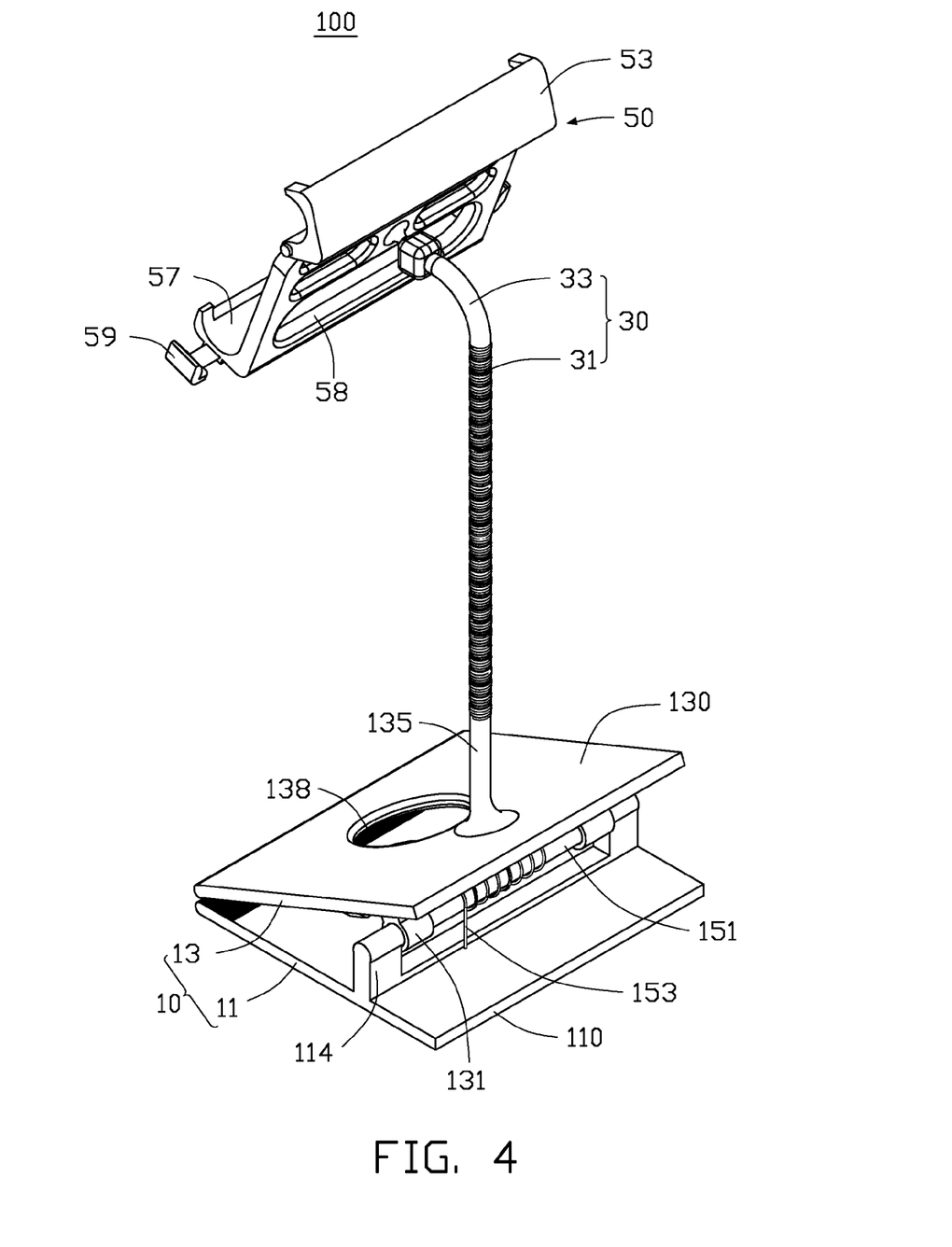
FIG. 4 shows the support in FIG. 1 transitioning to a different configuration.
Figure 5:
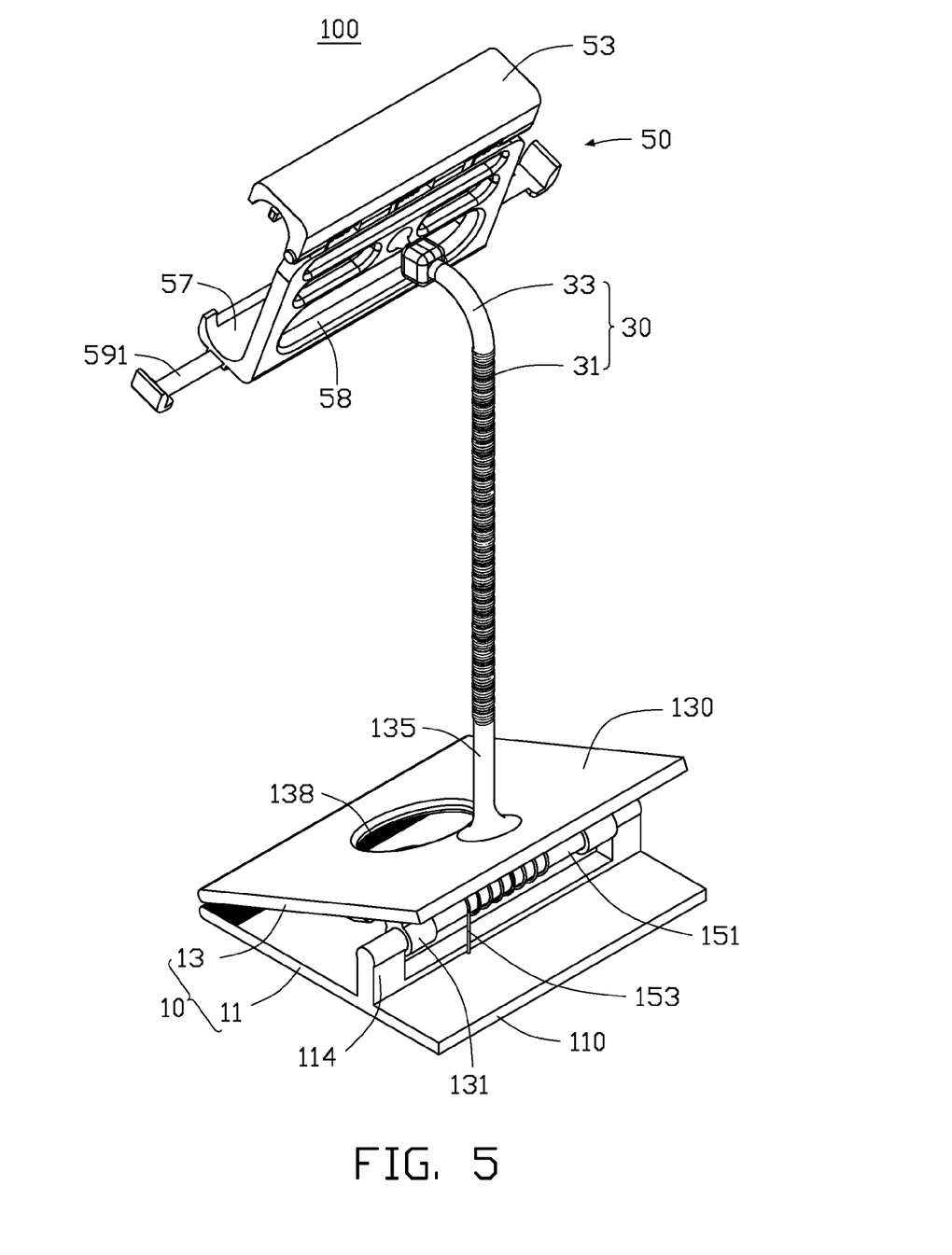
FIG. 5 shows the support in FIG. 1 transitioning to a different configuration.

The holding device 50 can include a support member 51, a clamping member 53 coupled to the support member 51. The holding device 50 defines a holding portion 57 configured to receive electronic device such as mobile phone, tablet or others between the support member 51 and clamping member 53. The holding portion 57 is adjustable in size for fitly receiving the electronic devices in different sizes. In at least one embodiment, the holding portion 57 can be adjustable in size along a first direction. In at least an alternative embodiment, the holding portion 57 can be adjustable in size along the first direction and a second direction perpendicular to the first direction. The holding portion 57 has an opening 52 between the support member 51 and the clamping member 53. In at least one embodiment, the support member 51 and the clamping member 53 cooperatively clamp the electronic device when the electronic device is received in the holding portion 57. For example FIG. 1, FIG. 4 and FIG. 5 illustrate the holding portion 57 is transitionable between: (i) a first configuration in which the holding portion 57 between the support member 51 and the clamping member 53 is in a first size for receiving a first electronic device, and (ii) a second configuration in which the holding portion 57 between the support member 51 and the clamping member 53 is in a second size different from the first size, for receiving a second electronic device different from the first electronic device in size. The second electronic device can be the first electronic device in different orientations.

The support member 51 can include a main body 511 and an extension body 513 extending from the main body 511. The extension body 513 is angled to a first side of the main body 511. The first side extends along the second direction.

In at least an embodiment, the extension body 513 is substantially perpendicular to the main body 513. The opening 52 is defined between the extension body 513 and the clamping member 53. In at least one embodiment, the clamping member 53 is movable, particularly rotatable, relative to the main body 511 to have the holding portion 57 is transitionable between the first configuration and the second configuration.

The main body 511 can be coupled to the connector 335 of the coupling device 30. The main body 511 has an outer face thereof extending a connecting part 5115 toward the connector 335. The connecting part 5115 is substantially perpendicular to the main body 511. In at least an embodiment, the connecting part 5115 can be fixed to the connector 335. The connecting part 5115 can be movably received in the activity room 3335 of the coupling portion 333 of the coupling device 30. In at least an embodiment, the connecting part 5115 is a column pole. The connecting part 5115 has a diameter less than that of the connector 335. In at least an embodiment, the connector 335 can integrally extend from a distal end of the connecting part 5115.

The main body 511 can extend a first coupling part from a second side thereof remote form the extension body 513 toward and for coupling the clamping member 53. The second side is substantially parallel the first side. The first coupling part can include two spaced blocks 5111 extending toward the clamping member 53. Each block 5111 defines a pivot hole 5113. The main body 511 can define a plurality of through apertures 518 for dissipating heat when the electronic device holding in the holding portion 57 is in use. The through apertures 518 can be in different sizes.

The extension body 513 can have an inner portion thereof concaved to define a first holding tank 510 in the holding portion 57 and extending along the second direction.

The clamping member 53 is corresponding to the extension body 513 and coupled to the main body 511. As FIG. 1 and FIG. 4 illustrate, the clamping member 53 is rotatable relative to the support member 51 and can be transitionable between: (i) the first configuration in which the extension body 513 and the clamping member 53 define a distance therebetween along the first direction for receiving the first electronic device between the extension body 513 and the clamping member 53, and (ii) the second configuration in which the extension body 513 and the clamping member 53 define a second distance therebetween along the first direction for receiving the second electronic device different from the first electronic device in size along the first direction between the extension body 513 and the clamping member 53.

The camping member 53 can have an inner face thereof concaved to define a second holding tank 530. The second holding tank 530 is corresponding to the first holding tank 510 for holding the electronic device in the holding portion 57. The first holding tank 510 and second holding tank 530 are substantially parallel to each other and for locating the electronic device in the holding portion 57 along the first direction.

The clamping member 53 can have an edge thereof extending a second coupling part toward and for coupling the first coupling part of the main body 511. The second coupling part can include two spaced lugs 530 each defining a receiving aperture 531.

The connecting device 55 can include a coupling shaft 551 and an elastic device 553 sleeving on the coupling shaft 551. The elastic device 553 can include at least one torsional spring. In this embodiment, elastic device 553 can include three torsional springs.

In detail, in an assembly of the support member 51 and the clamping member 53, the two blocks 5111 of the first coupling part and the two lugs 530 of the second coupling part are substantially in a straight line extending along the second direction. The two blocks 5111 is located between and spaced from the two lugs 530. The coupling shaft 551 is received in the pivot holes 5113 of the blocks 5111 and the receiving apertures 531 of the lugs 530. One torsional spring of the elastic device 553 is sleeved on the coupling shaft 551 and located between the two blocks 5111, the other two torsional springs of the elastic device 553 are respectively located between corresponding blocks 5111 and lugs 530. Each torsional spring of the elastic device 553 has two free ends thereof abutting against the main body 511 and the clamping member 53. Therefore, the clamping member 53 is rotatable relative to the support member 51 to define different angles between the clamping member 53 and the main body 511. That is to say, the clamping member 53 is rotatable relative to the support member 51 to define different distances between the extension portion 513 and the clamping member 53 along the first direction. So that, the electronic devices with different sizes along the first direction can be held by the clamping member 53 and the support member 51 in the holding portion 57, for example, different mobile phones with different widths can be held between the clamping member 53 and the extension body 513 of the support member 51. It can be understood that, a same electronic device such as a mobile phone or a tablet in different orientations can also be held by the clamping member 53 and the extension body 513 of the support member 51.

In at least one embodiment, the support member 51 can further include a clamp 59 coupled to the main body 511 or the extension body 513. The clamp 59 can include two spaced holding members 591 and a connection member 593. As FIG. 1 and FIG. 5 illustrate, the two holding members 591 are movable relative to the main body 511 and extension body 513 to have the holding portion 57 transitionable between the first configuration and the second configuration. In the first configuration, the two holding members 591 define a first distance therebetween along the second direction for receiving the first electronic device between the two holding members 591, in the second configuration, the two holding members 591 define a second distance therebetween along the second direction for receiving the second electronic device different from the first electronic device in size along the second direction between the two holding members 591.

In detail, each holding member 591 can include a positioning portion 5911 coupled to the connection member 593 and a holding portion 5913 extending from the positioning portion 5911 and configured to clamp the electronic device when the electronic device is received in the holding portion 57. The positioning portion 5911 and the holding portion 5913 can cooperatively define an L-shaped profile. The extension body 513 can have an outer face thereof projected outwards to form two spaced flanges 5131. The two flanges 5131 are parallel to each other and extending along the second direction. The two flanges 5131 define a locating groove 517 therebetween. The locating groove 517 extends along the second direction. The two positioning portions 5911 can be slidably received in the locating groove 517 of the extension body 513. The two holding portions 5913 extend outwardly beyond the locating groove 517. The two holding portions 5913 are corresponding to two ends of the first holding tank 510 of the extension body 513, respectively. The connection member 593 is received in the locating groove 517 and has two ends thereof fixed to the two positioning portions 5911, respectively. The connection member 593 can be an elastic member such as a rubber stripe, helical spring or other things. It can be understood that, under elastic force of the connection member 593, the two holding portions 5913 can extend away from or toward the extension body 513 for holding electronic devices in the holding portion 57 with different size in the second direction.

In an assembly of the positioning device 10, the coupling device 30 and holding device 50, the connecting part 311 of the strut 31 of the coupling device 30 is coupled to the mounting face 130 of the second board 13 of the positioning device 10. The connector 335 of the coupling device 30 is coupled to the connecting part 5115 of the support member 51 of the holding device 50.

Figure 6:
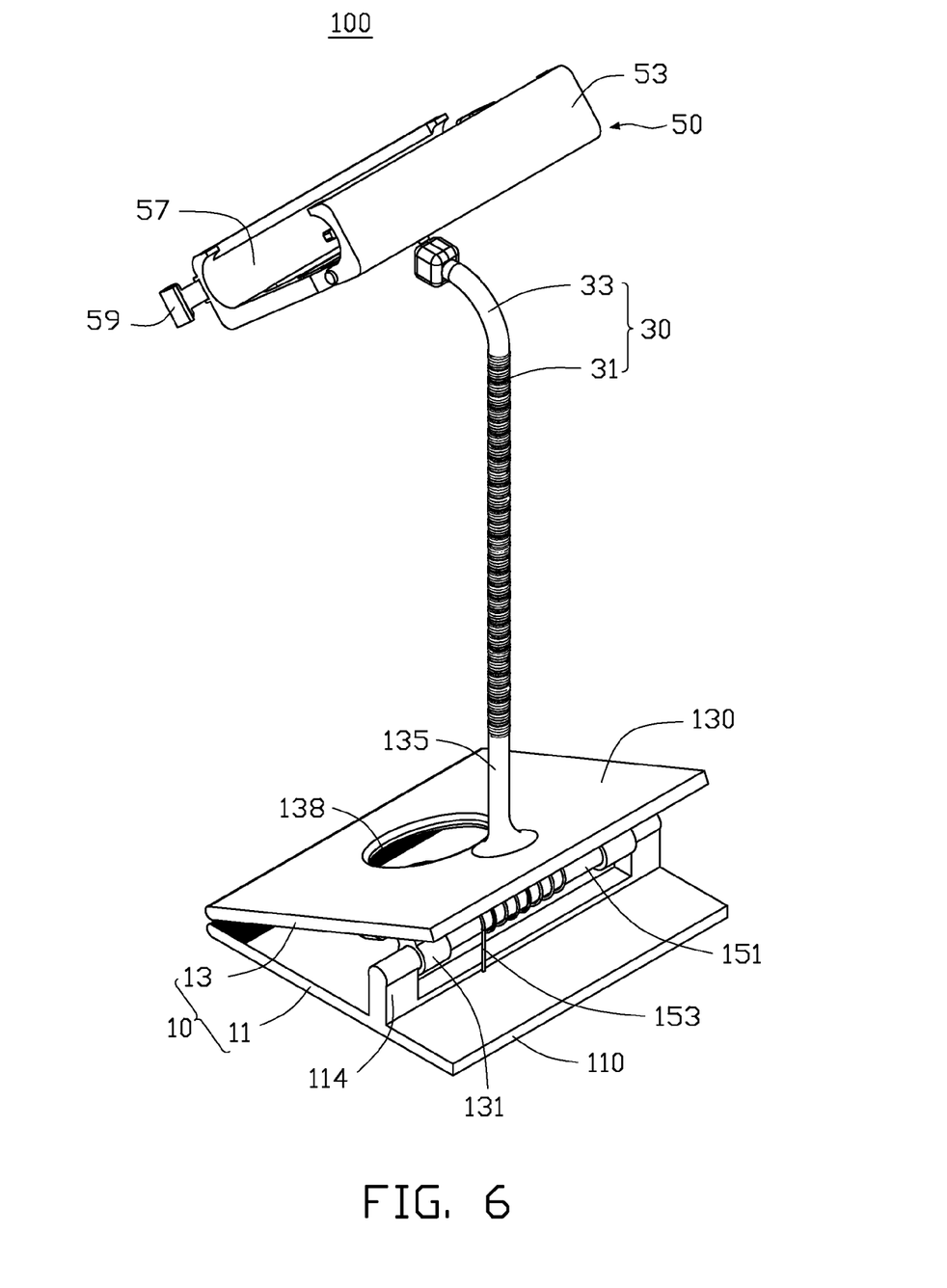
FIG. 6 shows the support in FIG. 1 transitioning to a different configuration.

In use, an electronic device is received in the first holding tank 510 of the extension body 513 of the support member 51 of holding device 50. The clamping member 53 is rotated relative to the support member 51 to have the electronic device received in the second holding tank 530 of the clamping member 53. Therefore, the electronic device is limited by the extension body 513 and the clamping member 53 in the first direction. The two holding members 591 of the clamp 59 are adjusted to clamp the electronic device. Therefore, the electronic device is located by the two holding members 591 in the second direction. As illustrated in FIG. 1 and FIG. 6, the holding device 50 can be adjusted to rotate to have the electronic device facing different directions via the connector 335 rotating in the receiving room 3331 of the coupling portion 333 of the coupling device 30, for meeting demand of directions of the user. The pole part 313 of the stud 31 of the coupling device 30 can be bent to different locations to have the electronic device in different positions when the user needs that. The first board 11 and the second board 13 of the positioning device 10 can clamp any object to position the support 10 to that object when the user needs that. The suction cup 17 of the positioning device 10 can suction a face of an object to position the support 10 to that object when the user needs that.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A support for an electronic device comprising:
a support member comprising a main body, an extension body extending from the main body, and a clamp coupled to the extension body;
a clamping member coupled to the main body and configured to move relative to the main body; and
the support member and the clamping member defining a holding portion that is configured to receive the electronic device;
wherein the support member, the clamp and the clamping member are configured to cooperatively clamp the electronic device in the holding portion, a locating groove is defined in an outer face of the extension body away from the clamping member to receive the clamp, the clamp comprises two holding members and a connection member connecting between the two holding members, and the connection member is an elastic member and located in the locating groove.

2. The support of claim 1, wherein the holding portion is transitionable between: (i) a first configuration in which the holding portion is in a first size for receiving a first electronic device, and (ii) a second configuration in which the holding portion is in a second size different from the first size, for receiving a second electronic device different from the first electronic device in size.

3. The support of claim 2, wherein the clamping member is rotatable relative to the main body to have the holding portion transitionable between the first configuration and the second configuration along a first direction.

4. The support of claim 3, wherein in the first configuration, the extension body and the clamping member define a distance therebetween along the first direction for receiving the first electronic device between the extension body and the clamping member; and in the second configuration, the extension body and the clamping member define a second distance therebetween along the first direction for receiving the second electronic device different from the first electronic device in size along the first direction between the extension body and the clamping member.

5. The support of claim 4, wherein the clamping member is rotatably coupled to the main body via a connecting device.

6. The support of claim 4, wherein the main body comprises two blocks extending toward the clamping member, the clamping member comprises two lugs, the connecting device comprises a coupling shaft coupled to the two blocks and the two lugs, and an elastic device coupled to the coupling shaft and abutted against the main body and the clamping member.

7. The support of claim 4, wherein the extension body defines a first holding tank in the holding portion, and the clamping member defines a second holding tank corresponding to the first holding tank, for holding the electronic device in the holding portion.

8. The support of claim 7, wherein the first holding tank and the second holding tank each extend along a second direction perpendicular to the first direction.

9. The support of claim 2, wherein the two holding members being movable relative to the extension body and the main body to have the holding portion transitionable between the first configuration and the second configuration.

10. The support of claim 9, wherein, in the first configuration, the two holding members define a first distance therebetween along a direction for receiving the first electronic device between the two holding members, and in the second configuration, the two holding members defines a second distance therebetween along the direction for receiving the second electronic device different from the first electronic device in size along the direction between the two holding members.

11. The support of claim 10, wherein the two holding members each are slidably received in the locating groove.

12. A support for an electronic device comprising:
a positioning device configured to position the support on an object;
a coupling device comprising a strut coupled to the positioning device and an adjusting member having a first end coupled to the strut; and
a holding device configured to hold the electronic device and rotatably coupled to a second end of the adjusting member;

a support member comprising a main body, an extension body extending from the main body, and a clamp coupled to the extension body;
a clamping member coupled to the main body and configured to move relative to the main body; and
the support member and the clamping member defining a holding portion that is configured to receive the electronic device;
wherein the support member, the clamp and the clamping member are configured to cooperatively clamp the electronic device in the holding portion, a locating groove is defined in an outer face of the extension body away from the clamping member to receive the clamp, the clamp comprises two holding members and a connection member connecting between the two holding members, and the connection member is an elastic member and located in the locating groove.

13. The support of claim 12, wherein the adjusting member comprises a coupling portion and a connector rotatably coupled to the coupling portion, the holding device comprising a connecting part coupled to the connector.

14. The support of claim 13, wherein the coupling portion defines a receiving room, the connector being rotatably blocked in the receiving room.

15. The support of claim 14, wherein the coupling portion further defines an activity room communicating with the receiving room, the connecting part of the holding device being rotatably received in the activity room.

16. The support of claim 12, wherein the strut comprises a pole part coupled to the connector, the pole part being a flexible member.

17. A support for electronic device comprising:
a positioning device configured to position the support on an object, the positioning device comprising a first board, a second board and a connecting member connecting the first board and the second board, the first board, the second board and the connecting member cooperatively configured to be a clip;
a holding device configured to hold the electronic device and coupled to the positioning device;
a support member comprising a main body, an extension body extending from the main body, and a clamp coupled to the extension body;
a clamping member coupled to the main body and configured to move relative to the main body; and
the support member and the clamping member defining a holding portion that is configured to receive the electronic device;
wherein the support member, the clamp and the clamping member are configured to cooperatively clamp the electronic device in the holding portion, a locating groove is defined in an outer face of the extension body away from the clamping member to receive the clamp, the clamp comprises two holding members and a connection member connecting between the two holding members, and the connection member is an elastic member and located in the locating groove.

18. The support of claim 17, wherein the positioning device further comprises a suction cup coupled the first board and extending beyond the first board for suctioning the object.

* * * * *